United States Patent [19]
Azarowicz

[11] 3,779,866
[45] Dec. 18, 1973

[54] MICROBIAL DEGRADATION OF POLYCHLORINATED BIPHENYLS

[75] Inventor: Edward N. Azarowicz, Vienna, Va.

[73] Assignee: Bioteknike International, Inc., Alexandria, Va.

[22] Filed: Apr. 7, 1972

[21] Appl. No.: 242,192

[52] U.S. Cl. .................................... 195/2, 195/3 H
[51] Int. Cl. ............................................. C12b 1/00
[58] Field of Search.................. 195/2, 3 H, 1, 28 R, 195/51 R, 82; 424/93; 210/2, 10, 11, 17

[56] References Cited
UNITED STATES PATENTS
3,616,204   10/1971   Linn......................................... 195/2
3,634,227   1/1972   Patterson ........................... 195/28 R Primary Examiner—A. Louis Monacell
Assistant Examiner—R. B. Penland
Attorney—Raymond C. Stewart et al.

[57] ABSTRACT

A process for the microbial degradation of polychlorinated biphenyls (PCBs) which comprises treating the PCBs with certain non-pathogenic, hydrocarbon-utilizing strains of Cladosporium cladosporioides, Candida lipolytica, Nocardia globerula, Nocardia rubra and/or Saccharomyces cerevisiae until the PCBs have been substantially degraded. The process is applicable degrading PCBs as they may be present as pollutants or contaminants in water, in industrial effluents, in various land areas such as industrial sites and the like or in varied laboratory or commercial installations. The process may also be used to clean up and degrade mixtures of PCBs and various hydrocarbon oils or petrochemicals whenever their presence constitutes a deleterious pollution.

29 Claims, No Drawings

MICROBIAL DEGRADATION OF POLYCHLORINATED BIPHENYLS

BACKGROUND OF THE INVENTION

This invention relates to a process for the microbial degradation of polychlorinated biphenyls. More particularly, it relates to a method for degrading polychlorinated biphenyls by means of microorganisms in order to clean up and eliminate such organic pollutants as they may occur in the open sea, inland fresh waters, tidal pools, harbors and the like, industrial effluent discharges, sewage and other pipeline systems, farm soil or other land areas including industrial sites, etc.. The invention is applicable not only for cleaning up polychlorinated biphenyls as contaminants and pollutants in open environmental systems, but also in closed systems as, for example, in industrial, commercial or government plants and installations and in various laboratory operations.

Environmental clean-up is of much concern to the country and to the world today. Polychlorinated biphenyls (hereinafter referred to as PCBs) are industrial chemicals that are widely used as plasticizers, fire retardant paint ingredients, hydraulic fluids and heat exchange fluids. They have recently been detected in various water sources, in human tissue and in many species of birds and fish. Being relatively heavy organic molecules, PCBs persist indefinitely under natural conditions. Moreover, they tend to accumulate in the food chain, and once ingested, they are stored in the tissues of birds, mammals and fish used as human food. As with many other chlorinated hydrocarbons, such as DDT, even small dosages of PCBs can be toxic.

PCBs are relatively inert compounds that have low solubilities in water. The commercially produced PCBs are actually mixtures of many of the isomers which are possible among the various combinations of chlorinated products that can be obtained from the chlorination of biphenyl. The most common industrial mixtures contain between about 40 and 60 percent by weight of chlorine, but the isometric composition thereof is relatively unknown. However, the more highly chlorinated PCBs appear to persist in the environment for the longest time.

PCBs are widely used as dielectric fluids in capacitors and transformers, as hydraulic fluids, as heat transfer agents and as plasticizers and solvents in various adhesives, sealants, paints and printing inks. Most of the release of PCBs into the environment probly occurs from industrial effluent discharges and dumping and leakage of lubricants, hydraulic fluids and heat transfer fluids into the waterways and soil, from materials containing PCBs as a plasticizer into the atmosphere, and as a result of leaching from dumps and landfills.

Although there is some evidence that PCBs can be dechlorinated by ultraviolet light and, thus, lead to the formation of hydroxyl derivatives and other polar compounds that are more readily degradable, PCBs are very persistent and are extremely difficult to degrade once they are present in the environment. PCB residues have been particularly noted in fish, birds and mammals, which include those used for human food as well as the wild animals. Although the data are incomplete at the present time, there is significant evidence that most humans have some residues of PCBs in their tissues. The effect on humans of such residues is also unclear at the present time, but some evidence indicates very severe and harmful effects from PCB poisoning. There is some evidence that PCBs alter liver tissue, inhibit the growth of cultured cells and affect a variety of enzyme systems and the genetic material of cells, but in most cases, the mechanism of action is still uncertain. In any event, the presence of PCBs in the environment has been a great concern to scientists and other people concerned with health, safety and welfare, and there has been a great need for the development of a procedure for degrading these substances.

Accordingly, one of the objects of the present invention is to provide a method for degrading polychlorinated biphenyls and similar halogenated molecules, such as DDT, wherever they may appear as contaminants or pollutants.

Another object of the present invention is to provide a process for the microbial degradation of polychlorinated biphenyls wherever desired, for example, as a means of cleaning up closed and open waters, industrial effluent discharges, polluted marshlands, estuaries, marine environments, disposal lagoons, contaminated industrial areas and farmlands, and in other situations where PCBs may become accumulated.

A further object of the invention is to provide a procedure for degrading polychlorinated biphenyls readily, efficiently and relatively economically.

A still further object of the invention is to provide microorganisms that are capable of degrading polychlorinated biphenyls, leaving a detoxified and beneficial cell mass, these microorganisms being completely non-pathogenic to marine fauna and flora, humans and animals.

Yet another object of the invention is to provide a method for the degradation of polychlorinated biphenyls wherein there is no need for the handling, transporting and storage of heavy bulky equipment.

These and other objects and advantages of the present invention will become apparent to those skilled in the art from a consideration of the following specification and claims.

SUMMARY OF THE INVENTION

In accordance with the present invention, the above objectives are attained and an advantageous procedure for the microbial degradation of polychlorinated biphenyls has been discovered employing particular strains of microorganisms. The distinct, unique advantage of the present invention is that all of the materials used are derived orginally from edible substances which are not toxic. It is applicable equally to the degradation of industrial wastes in general as well as to the degradation of PCBs in open and closed aqueous systems no matter how the system was contaminated and polluted. In the present invention, advantage has been taken of judiciously choosing microorganisms which are capable of degrading PCBs and using them as a carbon source for growth.

The present invention comprises a purely biological process in which certain selected microorganisms break down the PCBs and convert the contaminants into masses of edible, non-toxic cells, i.e., a protein mass. In an outdoor application, this cell mass can be channeled into the food chain to feed higher forms of life and, thus, a very advantageous end result is achieved in addition to solving the problem of PCB contamination. There is no need for ancillary clean-up operations when PCBs are degraded in accordance with the invention and, as pointed out above, there is also no need for the handling, transporting and storing of heavy, bulky equipment.

The following microorganisms, all completely novel and unobvious, are utilized in the present invention. These microorganisms are special species which have been adapted to achieve the objectives of the invention. They have been deposited with the American Type Culture Collection in Rockville, Maryland and have been given the designated ATCC catalogue numbers:

Cladosporium cladosporioides (BI 3002) ATCC 20251
Candida lipolytica (BI 2002) ATCC 20255
Nocardia globerula (BI 1039) ATCC 21505
Nocardia rubra (BI 1002) ATCC 21508
Saccharomyces cerevisiae (BI 2009) ATCC 20252

The characteristics and properties of these microorganisms are described in copending application Ser. No. 43,226, filed on June 3, 1970, entitled "Microbial Degradation of Petroleum".

Various media can be employed in handling these cultures. All of the microorganisms employed in the present invention will grow on media with 100 percent marine water, with part marine water and part tap water, or in distilled water. The following medium has been found to be quite satisfactory as a general use, all-purpose medium for maintaining stock cultures:

All-Purpose Medium

Heart infusion broth (Difco) — 23.0 g.
Yeast extract (Difco) — 3.0 g.
Glycerol — 5.0 ml.
Glucose — 5.0 g.
Agar — 15.0 g.
Water — 1000 ml.

The standard Bushnell-Haas Broth has been found to be quite suitable as a growth medium on the laboratory scale. A typical medium comprises the following ingredients:

Yeast-nitrogen base (Difco) — 1.0 g.
Yeast extract (Difco) — 1.0 g.
$MgSO_4$ — 0.2 g.
$CaCl_2$ — 0.02 g.
$KH_2PO_4$, Monobasic — 1.0 g.
$K_2HPO_4$, Dibasic — 1.0 g.
$NH_4NO_3$ — 1.0 g.
$FeCl_3$ — 0.05 g.
Bromthymol blue — 0.08 g.
Water — 1000 ml.

The following medium has been found to be particularly advantageous for the large-scale production of the desired cultures:

Skim milk (0.4 percent) — 2.0 lbs.
Cottonseed meal (1.8 percent) — 9.0 lbs.
Marine Salts (0.02 percent) — 0.1 lb.
$(NH_4)_2HPO_4$, Dibasic (0.1 percent) — 0.5 lb.
Hydrocarbon (0.44 percent) — 2.2 lbs.
Tap Water — 60.0 gal.

Instead of the marine salts and tap water, native sea water can be used in the above medium. Aeration is usually provided to supply oxygen to the fermentor vessel or tank. Generally, the microorganism cells are harvested after about three or four days of cultivation. A large batch vessel or fermentor seeded with a young culture equivalent to about 2 percent or more of the total capacity of the fermentor is used for producing large quantities of the cultures. If necessary, an antifoam agent can be employed therein, for example, Dow Antifoam A, or crude oil.

Hence, either a synthetic culture medium or a natural nutrient medium is suitable for the growth of the microorganism strains employed in the present invention as long as it contains the essential nutrients for the growth of the particular microorganism strain or strains used. Such nutrients are well known in the art and include substances such as a carbon source, a nitrogen source, inorganic compounds and the like which are utilized by the microorganisms employed in appropriate amounts.

The microorganisms used in the present invention grow and survive in an aqueous nutrient medium containing a hydrocarbon or a mixture of hydrocarbons as the main carbon source. Such hydrocarbons include straight and branched-chain paraffins (alkanes) ranging from gaseous alkanes, such as methane and propane, liquid or semi-solid alkanes, such as n-pentane, n-octane, n-decane, n-dodecane, n-hexadecane, isopentane, isooctane, and including long-chain solid paraffins having high melting points, cycloparaffins such as cyclohexane and cyclooctane, straight- and branched-chain olefins such as pentene-2, hexene-1, octene-1, octene-2, etc., cycloolefins such as cyclohexene, aromatic hydrocarbons such as benzene, o-xylene, naphthalene, phenanthrenes, anthracenes, etc., and mixtures thereof, as well as mixed hydrocarbons such as kerosene, light oils, heavy oils, paraffin oils, petroleum crudes, jet fuels, gasoline, etc. Other organic substances, such as alcohols, aldehydes, ketones, organic acids, phenolics and aromatic heterocyclic and carbocyclic compounds, are utilized by the microorganisms described in the present application cation.

Small amounts of other carbon sources such as carbohydrates, for example, glucose, fructose, maltose, sucrose, starch, starch hydrolysate, molasses, etc., or any other suitable carbon source such as glycerol, mannitol, sorbitol, organic acids, etc. may be used in the culture medium along with the hydrocarbon. These substances may be used either singly or in mixtures of two or more.

As a nitrogen source, various kinds of inorganic or organic salts or compounds, such as urea or ammonium salts such as ammonium chloride, ammonium sulfate, ammonium nitrate, ammonium phosphate, etc., or one or more than one amino acid or crude protein mixed in combination, or natural substances containing nitrogen, such as cornsteep liquor, yeast extract, meat extract, fish meal, peptone, bouillon, casein hydrolysates, fish solubles, rice bran extract, etc., may be employed. These substances may also be used either singly or in combinations of two or more.

Inorganic compounds which may be added to the culture medium include magnesium sulfate, sodium phosphate, potassium dihydrogen phosphate, potassium monohydrogen phosphate, iron sulfate or other iron salts such as ferric trichloride, manganese chloride, calcium chloride, sodium chloride, ammonium nitrate, etc..

The microorganisms employed in the present invention are cultured under aerobic conditions, such as aerobic shaking of the culture or with stirring and aeration of a submerged culture, at a temperature of, for example, about 5° to 35°C., preferably 28°–30°C., and at a pH of, for example, about 5 to 8, preferably 7–7.6. The microorganisms are harvested at an appropriate time and are used as disussed below.

DETAILED DESCRIPTION OF THE PREFERRED EMBODIMENTS

The process of the invention can be used to remove polychlorinated biphenyls from locations wherever its presence constitutes a deleterious pollution. Thus, with this process, it becomes possible to clean up and degrade PCBs on the open sea, in harbors, rivers and other inland waters, on various kinds of beaches and soils, in industrial effluent systems, in sewage disposal systems, in various laboratory systems, etc..

The following examples are given merely as illustrative of the present invention and are not to be considered as limiting.

EXAMPLE 1

Pydraul 312A, a hydraulic fluid containing a mixture of PCBs and an oil-soluble dye, is poured into five separate 250 ml. Erlenmeyer flasks to give a concentration of 0.2 percent by weight of the Pydraul 312A in the flasks, which each contain 100 ml. of the following medium:

Yeast-nitrogen base (Difco) — 0.1 g.
Yeast extract (Difco) — 0.1 g.
Peanut oil (0.2%) — 2.0 ml.
$MgSO_4$ — 0.02 g.
$CaCl_2$ — 0.002 g.
$KH_2PO_4$, Monobasic — 0.1 g.
$K_2HPO_4$, Dibasic — 0.1 g.
$NH_4NO_3$ — 0.1 g.
$FeCl_3$ — 0.005 g.
Bromthymol blue — 0.008 g.
Distilled water — to make 1000 ml.

The first flask is inoculated with Cladosporium cladosporioides ATCC 20251, the second flask with Candida lipolytica ATCC 20255, the third flask with Nocardia globerula ATCC 21505, the fourth flask with Nocardia rubra ATCC 21508 and the fifth flask with Saccharomyces cerevisiae ATCC 20252. The flasks are shaken at 170 r.p.m. at 27°C. for three days. At the end of three days, a visual examination of the flasks shows a disappearance of the globules of hydraulic fluid, which are heavier than water. The resulting cell mass is separated from each of the flasks, and the remaining liquid is analyzed by means of gas chromatography. The gas chromatographic analysis shows that the PCB concentration in each flask is not detectable and is thus less than 0.3 p.p.m.

EXAMPLE 2

A 250 ml. Erlenmeyer flask containing 0.2 percent by weight of Pydraul 312A in the same medium as described in Example 1 is inoculated with a mixture of Cladosporium cladosporioides ATCC 20251 and Candida lipolytica ATCC 20255. The flask is shaken at 170 r.p.m. at 27°C. for three days. A visual examination of the flask shows a disappearance of the hydraulic fluid, and after separation of the resulting cell mass, gas chromatographic analysis indicates that the PCB concentration is less than 0.3 p.p.m.

EXAMPLE 3

In the same manner as described in Example 1, a mixture of Cladosporium cladosporioides ATCC 20251, Candida lipolytica ATCC 20255, Nocardia globerula ATCC 21505, Nocardia rubra ATCC 21508 and Saccharomyces cerevisiae ATCC 20252 is inoculated into a 250 ml. Erlenmeyer flask containing 0.2 percent by weight of Pydraul 312A in 100 ml. of the described medium, the flask is shaken for three days on a shaker at 27°C., and the resulting cell mass is removed from the flask. Analysis of the remaining liquid by means of gas chromatography shows that the PCB concentration is less than 0.3 p.p.m..

The same results are obtained when the procedure is carried out using other mixtures of two or more of said microorganisms. Hence, the described microorganisms may be used either singly or in various combinations of two or more to degrade PCBs in accordance with the objectives of the invention.

Generally, the degradation of PCBs on a large scale is conducted in a multi-tank installation. Less often, degradation is done in outdoor environments. In open water applications, it is quite feasible to seed or disperse the microorganisms employed by means of boats, aircraft or other vehicles as appropriate. Even though the PCBs are heavier than water, degradation takes place since the microorganisms become dispersed downward with time to the benthic mud. The mixture employed preferably includes a cellulose absorbent such as, for example, straw, bagasse, pine bark mulch, sawdust or other forest or agricultural products. Additive nutrients for the microorganisms are also mixed with the absorbent, such as cottonseed protein or other inexpensive agricultural by-products and inorganic salts of nitrogen and phosphorus. The process is applicable from just above freezing temperature (about 4°C.) to about 39°C.. The PCB degradation will begin upon spreading the mixture on the surface of the water. Complete degradation may take place as early as three days to one week, but could take longer depending upon the PCB concentration and the temperature conditions. Of course, it is not necessary to use an absorbent, and the microorganisms can be used as a foam or in a slurry, powdered or pelletized form with added nutrients.

With an application on dry or damp soil, the mixture of microorganisms and nutrients can be applied to the soil and the mixture will work aerobically and anaerobically to degrade the contaminant PCBs. This procedure is especially effective on extremely wet surfaces such as marsh lands, farm lands or industrial land sites such as trucking areas and railroad sidings.

The most practical application of the present invention involves the degradation of PCBs in waste materials from industrial plants or other types of commercial installations, where PCBs are spilled accidentally by leakage from heat exchangers. In this application, the effluent material to be degraded can be placed into large holding tanks, for example, and the mixture of microorganisms and nutrients added thereto, whereby degradation will take place as described above. Stirring and aeration of the mixture inside the tank is advantageously employed to provide a more rapid degradation. A single tank system may be used, or a multi-tank system may be employed wherein the effluent material is moved from tank to tank at specified times. Additional microorganism cultures and nutrients for the microorganisms may be added to the subsequent tanks as desired, for example, to obtain a desired or necessary level of PCB concentration. The degraded effluent, for example, may then be discharged into a lake, stream, marsh, etc., or the water may be recirculated within the industrial plant.

Since the microorganisms of the present invention are also capable of degrading petroleum and various petrochemical substances, as described in copending application Serial Number 43,226, the process of the present invention may be employed with effluents which contain petroleum or petrochemical contaminants as well as PCBs, for example, emulsified cutting oils or rolling mill coolants. The degradation of one substance is not affected by the degradation of other substances, and a complete clean-up operation of, for example, a total industrial waste problem, can be effectuated in this manner.

The microorganism or mixture of microorganisms is advantageously added in slurry form in an amount of about 1 percent to 5 percent, preferably 2 percent, by volume to an aqueous solution containing about 10 p.p.m. to about 15 percent by weight of PCBs for optimum degradation action. If the mixture to be degraded contains oil and other organic pollutants besides PCBs, a concentration of several percent (W/V) of microorganism-nutrient mixture is usually sufficient to be effective. About 1 percent to 5 percent by weight is desirable.

It is to be noted that a balanced nutritional medium, including a carbon source and additive nitrogen and phosphorous nutrients, is provided for the microorganisms employed. Since the additives used are of agricultural or forest sources, they are safe and non-toxic. Accordingly, the entire procedure is safe and non-toxic since the microorganisms themselves are not toxic to humans, animals or fish. The carbon source can be PCBs alone, or a mixture of PCBs and other hydrocarbons at concentrations of trace up to about 15 percent by weight.

It can thus be seen that the present invention provides a desirable and advantageous process for degrading and cleaning up polychlorinated biphenyls, as well as petroleum or petrochemical pollutants and contaminants, by means of microbial degradation, so as to restore the polluted material to an ecologically-clean condition. This procedure is carried out safely and relatively economically without any harm whatsoever to human, animal or marine life.

It is to be understood that the present invention embraces the use not only of the above-described microorganisms, which are given merely for illustrative purposes, but it also includes the use of mutants produced from the specifically enumerated microorganisms, providing that they perform the same function. It is to be further understood that the invention includes the use of subcultures obtained by various standard microbiological techniques. Such mutants and/or subcultures may differ in certain respects from the above-described new strains, but they will work to degrade PCBs in approximately the same manner as disclosed above.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A process for the microbial degradation of polychlorinated biphenyls which comprises treating said polychlorinated biphenyls with at least one microorganism selected from the group consisting of nonpathogenic, cell-mass producing, hydrocarbon-utilizing strains of Cladosporium cladosporioides, Candida lipolytica, Nocardia globerula, Nocardia rubra and Saccharomyces cerevisiae for sufficient time until the polychlorinate biphenyls have been substantially degraded.

2. The process of claim 1, wherein said microorganism is mixed with a cellulosic material.

3. The process of claim 1, wherein said microorganism is mixed with a cellulosic material, a nitrogen source and a phosphorus source.

4. The process of claim 1, wherein said microorganism is added to an aqueous solution containing the polychlorinated biphenyls in slurry form in an amount of approximately 1 percent to 5 percent by volume.

5. The process of claim 2, wherein said cellulosic material is selected from the group consisting of sawdust, pine bark, wood flour, cotton linters, cottonseed hulls, straw, bagasse, marsh hay and shredded paper.

6. The process of claim 3, wherein said nitrogen source is cottonseed protein.

7. The process of claim 1, wherein said microorganism is employed in a slurry form.

8. The process of claim 1, wherein said microorganism is employed in a pelletized form.

9. The process of claim 1, wherein said microorganism is employed in a powdered form.

10. The process of claim 1, wherein said microorganism is employed in the form of a foam.

11. A process for the microbial degradation of polychlorinated biphenyls which comprises treating said polychlorinated biphenyls with at least one microorganism selected from the group consisting of Cladosporium cladosporioides ATCC 20251, Candida lipolytica ATCC 20255, Nocardia globerula ATCC 21505, Nocardia rubra ATCC 21508, and Saccharomyces cerevisiae ATCC 20252 for a sufficient time until the polychlorinated biphenyls have been substantially degraded.

12. The process of claim 11, wherein said microorganism is mixed with a cellulosic material.

13. The process of claim 11, wherein said microorganism is mixed with a cellulosic material, a nitrogen source and a phosphorus source.

14. The process of claim 11, wherein the polychlorinated biphenyls are contained in an aqueous solution and said microorganism is added thereto in slurry form in an amount of about 1 percent to 5 percent by volume.

15. The process of claim 14, wherein about 2 percent by volume of the microorganism slurry is added to the solution of polychlroinated biphenyls.

16. The process of claim 14, wherein the concentration of polychlorinated biphenyls in said aqueous solution is about 10 p.p.m. to about 15 percent by weight.

17. The process of claim 12, wherein said cellulosic material is selected from the group consisting of sawdust, pine bark, wood flour, cotton linters, cottonseed hulls, straw, bagasse, marsh hay and shredded paper.

18. The process of claim 13, wherein said nitrogen source is cottonseed protein.

19. The process of claim 11, wherein said microorganism is employed in a slurry form.

20. The process of claim 11, wherein said microorganism is employed in a pelletized form.

21. The process of claim 11, wherein said microorganism is employed in a powdered form.

22. The process of claim 11, wherein said microorganism is employed in the form of a foam.

23. The process of claim 11, wherein said microorganism is added to the polychlorinated biphenyls at a temperature of approximately 4°C. to approximately 39°C..

24. The process of claim 11, wherein said microorganism is Cladosporium cladosporioides ATCC 20251.

25. The process of claim 11, wherein said microoganism is Candida lipolytica ATCC 20255.

26. The process of claim 11, wherein said microorganism is Nocardia globerula ATCC 21505.

27. The process of claim 11, wherein said microorganism is Nocardia rubra ATCC 21508.

28. The process of claim 11, wherein said microorganism is Saccharomyces cerevisiae ATCC 20252.

29. The process of claim 11, wherein the polychlorinated biphenyls are contained in an aqueous solution which additionally contains hydrocarbon oils or other petrochemicals.

* * * * *